US008800933B2

(12) United States Patent
Dunn

(10) Patent No.: US 8,800,933 B2
(45) Date of Patent: Aug. 12, 2014

(54) SPACE DEBRIS REMOVAL

(75) Inventor: Michael J. Dunn, Federal Way, WA (US)

(73) Assignee: The Boeing Company, Chicago, IL (US)

(*) Notice: Subject to any disclaimer, the term of this patent is extended or adjusted under 35 U.S.C. 154(b) by 303 days.

(21) Appl. No.: 13/069,028

(22) Filed: Mar. 22, 2011

(65) Prior Publication Data

US 2012/0241562 A1 Sep. 27, 2012

(51) Int. Cl.
*B64G 1/10* (2006.01)
*B64G 1/56* (2006.01)
B64G 1/00 (2006.01)
B64G 4/00 (2006.01)
B64G 1/24 (2006.01)
B64G 1/40 (2006.01)

(52) U.S. Cl.
CPC . B64G 1/56 (2013.01); *B64G 1/007* (2013.01); *B64G 4/00* (2013.01); *B64G 1/1078* (2013.01); *B64G 1/242* (2013.01); *B64G 1/401* (2013.01); *B64G 1/403* (2013.01)
USPC ................................. 244/158.6

(58) Field of Classification Search
CPC ...... B64G 1/1078; B64G 1/242; B64G 1/007; B64G 4/00
USPC ............. 244/158.1, 158.7, 172.4, 113, 171.7, 244/164, 158.6
See application file for complete search history.

(56) References Cited

U.S. PATENT DOCUMENTS

| 2,873,721 | A | * | 2/1959 | Andrus et al. ............ 399/291 |
| 3,166,419 | A | * | 1/1965 | Gundlach ............ 430/120.1 |
| 3,182,445 | A | | 5/1965 | Lowes |
| 3,342,621 | A | * | 9/1967 | Point et al. ............ 427/475 |
| 3,525,223 | A | | 8/1970 | Radebold et al. |
| 3,618,860 | A | * | 11/1971 | Parilla et al. ............ 239/265.11 |
| 3,668,872 | A | | 6/1972 | Camp |
| 5,082,211 | A | | 1/1992 | Werka |
| 5,153,407 | A | * | 10/1992 | Schall ............ 219/121.6 |
| 5,156,333 | A | * | 10/1992 | Worsfold ............ 239/2.1 |
| 5,405,108 | A | * | 4/1995 | Marin et al. ............ 244/158.1 |
| 5,421,540 | A | | 6/1995 | Ting |
| 5,711,481 | A | * | 1/1998 | MacDonald et al. ............ 239/2.1 |
| 6,367,244 | B1 | | 4/2002 | Smith |
| 6,655,637 | B1 | * | 12/2003 | Robinson ............ 244/172.4 |
| 6,656,253 | B2 | * | 12/2003 | Willey et al. ............ 96/27 |

(Continued)

FOREIGN PATENT DOCUMENTS

| EP | 1811163 A2 | 7/2007 |
| RU | 2204508 | 5/2003 |
| WO | WO 2011103255 A1 * | 8/2011 |

OTHER PUBLICATIONS

Technical Report on Space Debris, United Nations Committee on the Peaceful Uses of Outer Space, New York, 1999.

(Continued)

*Primary Examiner* — Valentina Xavier
(74) *Attorney, Agent, or Firm* — Hugh P. Gortler

(57) ABSTRACT

A method comprises removing space debris having a relatively low ballistic coefficient by hastening orbital decay of the debris. A transient gaseous cloud is created at an altitude of at least 100 km above Earth. The cloud has a density sufficient to slow the debris so the debris falls into Earth's atmosphere.

15 Claims, 5 Drawing Sheets

(56) References Cited

U.S. PATENT DOCUMENTS

| | | | |
|---|---|---|---|
| 7,762,897 B2* | 7/2010 | Starr et al. | 472/65 |
| 2004/0129323 A1 | 7/2004 | Christensen | |
| 2006/0230767 A1* | 10/2006 | Gonzalez | 62/50.4 |
| 2007/0285304 A1* | 12/2007 | Cooper | 342/62 |
| 2010/0193640 A1 | 8/2010 | Atmur et al. | |
| 2011/0210208 A1* | 9/2011 | Ganguli et al. | 244/158.1 |
| 2012/0175466 A1* | 7/2012 | Gregory et al. | 244/158.7 |
| 2013/0082146 A1* | 4/2013 | Kofford | 244/158.7 |
| 2013/0181061 A1* | 7/2013 | Carpenter et al. | 239/1 |

OTHER PUBLICATIONS

"Project ADR: Removal of large orbital debris interests NASA—Study" http://www.nasaspaceflight.com/2011/01/project-adr-removal-large-orbital-debris-nasa-study/.

* cited by examiner

FIG. 6

610 — CLOUD GENERATION APPARATUS

- STORAGE UNIT
  - EXPELLANT 620
- 630

↓

- GAS GENERATOR — 640

↓

- NOZZLE — 650

SPACE DEBRIS REMOVAL

BACKGROUND

The Earth is orbited by objects that were created as byproducts of space travel and no longer serve any useful purpose. Larger objects include spent rocket stages and defunct satellites. Smaller objects, which are far more abundant, include paint flakes, dust, solid propellant exhaust slag, nuclear reactor coolant, and fasteners. These objects are referred to as space debris.

Space debris presents a potential collision risk to manned spacecraft and unmanned satellites. Even the smaller debris, which has a size of one centimeter or less, can cause problems. For instance, unprotected spacecraft components are subject to constant wear by very small particles having a size of one micron or less.

There is a need to remove small space debris.

SUMMARY

According to an aspect herein, a method comprises removing space debris having a relatively low ballistic coefficient by hastening orbital decay of the debris. A transient gaseous cloud is created at an altitude of at least 100 km above Earth. The cloud has a density sufficient to slow the debris so the debris falls into Earth's atmosphere.

According to another aspect herein, a method for removing space debris having a relatively low ballistic coefficient comprises performing a Prandtl-Meyer expansion of gas into a gaseous cloud at an altitude of at least 100 km above Earth. The cloud has a density sufficient to slow the space debris so the debris falls into Earth's atmosphere. The cloud does not target any specific debris.

According to another aspect herein, an apparatus for creating a transient gaseous cloud comprises an expellant including at least one of the following: a burn metal of higher atomic weight than aluminum fuel; a cryogenic noble gas; a heavy molecular fluid having a low isentropic exponent; and high-atomic-weight elements and halogens. The apparatus further comprises a gas generator for generating a gas from the expellant, and a nozzle for expanding the gas into a gaseous cloud.

BRIEF DESCRIPTION OF THE DRAWINGS

FIG. 6 is an illustration of an apparatus for creating a gaseous cloud for removing space debris.

DETAILED DESCRIPTION

Figure 1:
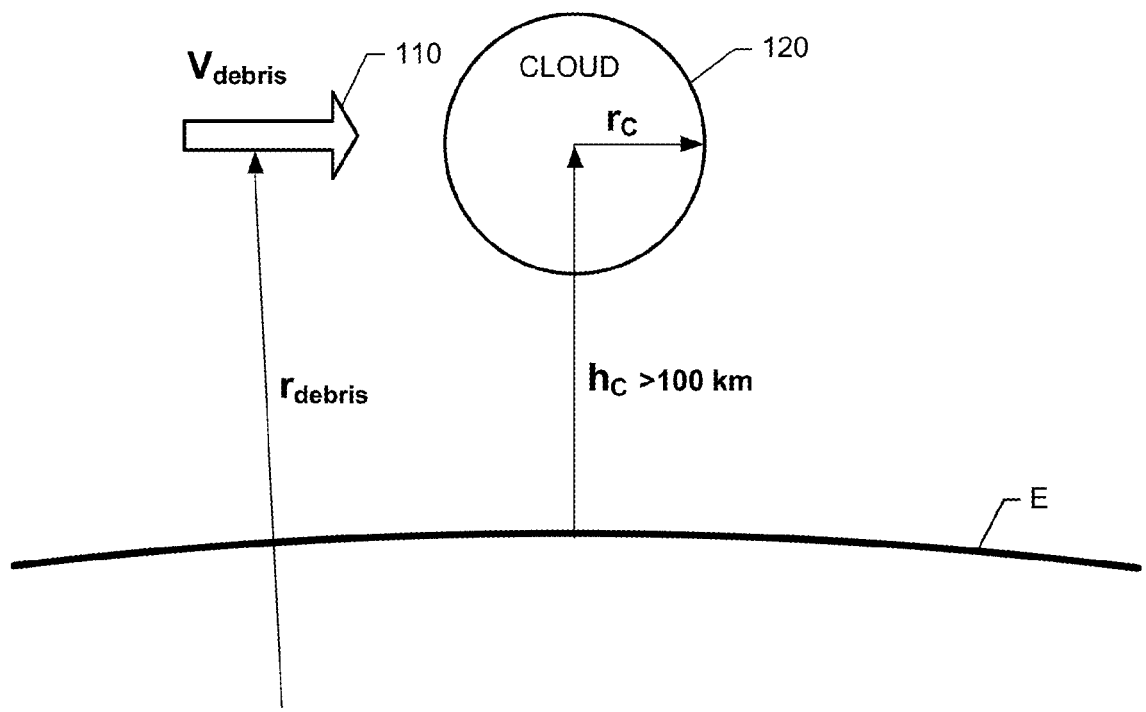
FIG. 1 is an illustration of a gaseous cloud for removing space debris having a relatively low ballistic coefficient.

Reference is made to FIG. 1. Planet Earth (E) is orbited by space debris 110 having a relatively low ballistic coefficient (the space debris is represented by the arrow). Such debris includes, but is not limited to, bolts, fasteners, and flecks of paint. Such debris may also include larger objects that enclose significant volume and have a large frontal area and a low effective density (e.g., pressurant tanks).

Ballistic coefficient $\beta$ (newtons/meters$^2$) is a convenient parameter for characterizing the susceptibility of the debris to being decelerated by an aerodynamic environment having a particular dynamic pressure. It may be defined as $\beta = W/C_d A$, where W is the object weight (newtons), $C_d$ is the drag coefficient ($C_d = 1$ for free molecular flow), and A is the frontal object area (meters$^2$).

The smaller debris, having a size of less than 0.1 cm, is fairly uniformly distributed, like a diffuse cloud of particles. The density of the smaller debris is inversely proportional to the mass of the particles. The bulk of small space debris has a ballistic coefficient ($\beta$) between 0.02 and 50 nwt/m$^2$. For spherical particles, the ballistic coefficient $\beta$ can be approximated as $\beta = 2/3 d\rho g/C_d$, where $\rho$ is material density, g is the standard gravitational constant, and d is particle diameter.

The space debris 110 orbits Earth at a speed of $v_{debris} = (\mu_E / r_{debris})^{1/2}$, where $\mu_E$ is the gravitational parameter for Earth (398,601.2 km$^3$/sec$^2$) and $r_{debris}$ is the circular orbit radius from Earth's center. For example, at an altitude of 100 km, $v_{debris} = 7.844$ km/sec.

Figure 2:
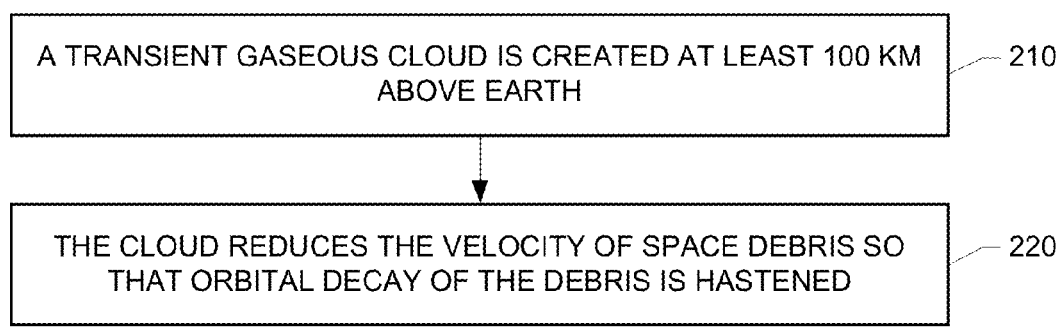
FIG. 2 is an illustration of a method of removing space debris.

Additional reference is made to FIG. 2. Some of this debris can be removed by creating a gaseous cloud 120 above Earth at a target altitude $h_c$ (block 210). The cloud has a density sufficient to reduce the velocity of the space debris so that orbital decay of the debris is hastened and the debris falls into Earth's atmosphere (block 220).

Figure 3:
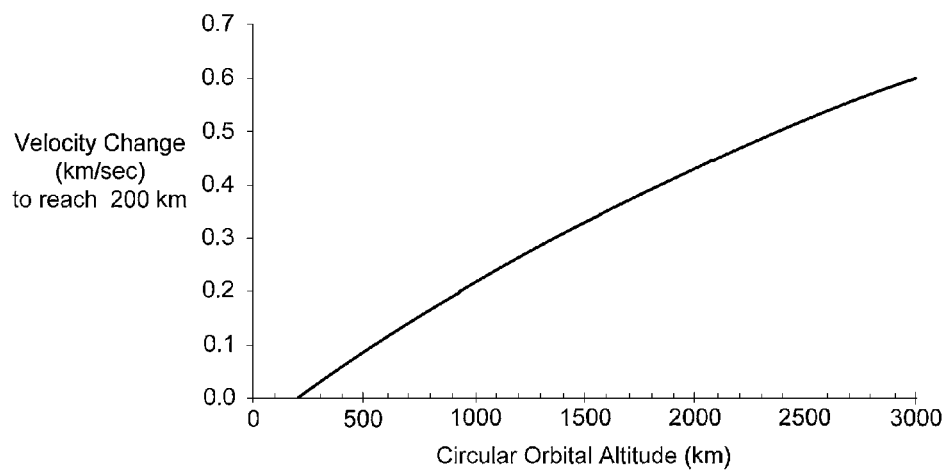
FIG. 3 is an illustration of estimated velocity change for orbital decay of space debris.

FIG. 3 illustrates estimated velocity change for orbital decay of an space debris as a function of circular orbital altitude. A velocity change of 0.7 km/second, for example, is expected to lower debris from a residence altitude as high as 3,000 km to an altitude at which orbital re-entry is certain. For debris at an altitude of 1,000 km, a velocity change of less than 220 m/sec is expected to hasten orbital decay.

In some embodiments, the cloud 120 may have an areal density of $10^{-3}$ kg/m$^2$ to $10^{-8}$ kg/m$^2$, a size (e.g., diameter) of 50 km to 500 km, and a mass of 1,000 kg to 10,000 kg. However, these parameters are application-specific. There will be a tradeoff between density and size of the cloud 120. A higher density cloud will slow objects more, but it will cover a smaller area and, therefore, capture fewer particles.

Assume the cloud is created at nearly motionless initial conditions by a rocket. Let u represent jet velocity, and ISP represent the specific impulse of the rocket. Drag density ($\rho_G$) of the cloud 120 can be estimated as $$\rho_G = 2[\beta \Delta v(h_C)/\Delta t g]/[v_C(h_C) + gIsp]^2 \text{ or}$$

$$\rho_G = 2\beta \Delta v(h_C)/\Delta t g[v_C(h_C) + gIsp]^2$$

where $h_C$ is altitude of the cloud 120; $v_C$ is cloud velocity; $\Delta v$ is a change in orbital velocity; and $\Delta t$ is transit time to cross the cloud 120.

Drag areal density ($\sigma G$) can be estimated as a product of the drag density and the distance traveled in $\Delta t$, in order to obtain the drag areal density, $\sigma G$, as $$\sigma_G = \rho_G \Delta t (v_C + v_A)^{1/2}$$

where the last term is the average speed of passage (mean of incoming circular orbital speed $v_C$ and outgoing elliptical apogee speed $v_A$).

The cloud 120 may have a shape of one of a sphere, hemisphere, sector of a sphere (limiting to a conical shape), and sphere with sector removed. The preference depends in part upon whether the properties of the gases tend toward reduced or increased Prandtl-Meyer expansion. Volume nearest the axis of the cloud 120 is maximized in order to maximize the areal density of the cloud 120.

The cloud 120 causes the smaller space debris to experience drag. In the extremely low pressure environment of space, this drag is not the normal aerodynamic drag (formation of a shock wave, for example), but rather "Newtonian flow", where the individual gas molecules impinge on the fast-traveling particles, and create drag by momentum exchange with those particles.

In some embodiments, the cloud 120 is relatively static and collides with orbital debris and slows orbital motion of the debris. Most of the relative velocity of the "collision" comes from the orbital speed of the debris.

In other embodiments, the cloud 120 is created to travel in a countering trajectory to the debris with some significant speed (e.g., 1 km/sec). For example, cloud-generating apparatus is placed on a trajectory heading in the opposite direction to the orbital motion of the space debris. This will have the effect of reducing the apparent gravitation and will prolong the dwell time at altitude.

The gaseous cloud 120 is located at an altitude $h_c$ of at least 100 km above Earth. An altitude below 100 km is not useful, because any debris at that altitude is already on a path that will lead to aerodynamic drag and orbital decay. At altitude of 100 km or higher, the value of creating aerodynamic drag increases as a continuous function, with no terribly obvious breakpoints. However, a significant portion of the space debris exists at relatively low altitudes, and 400 km is a representative operational altitude for most low-altitude satellites.

The gaseous cloud 120 is transient. The gaseous cloud 120 is created at a density and temperature to dissipate seconds after creation and fall into the atmosphere. The cloud radius $r_C$ will grow at a final expansion velocity, and then the cloud 110 will diminish in density. The centroid of the cloud 120 will follow the ballistic trajectory of the apparatus that creates the cloud 120. For a suborbital trajectory, the cloud 120 will eventually sink down into the atmosphere and vanish. Depending on the altitude, the gas could fall back into the atmosphere within seconds (at an altitude of 100 km), tens of seconds (at an altitude of 400 km) or longer.

More than one gaseous cloud 120 may be created. Different cleanup zones above Earth may be targeted, and a cloud may be formed at each zone. Rather than targeting specific particles, the clouds 120 function as cleanup nets.

Figure 4:
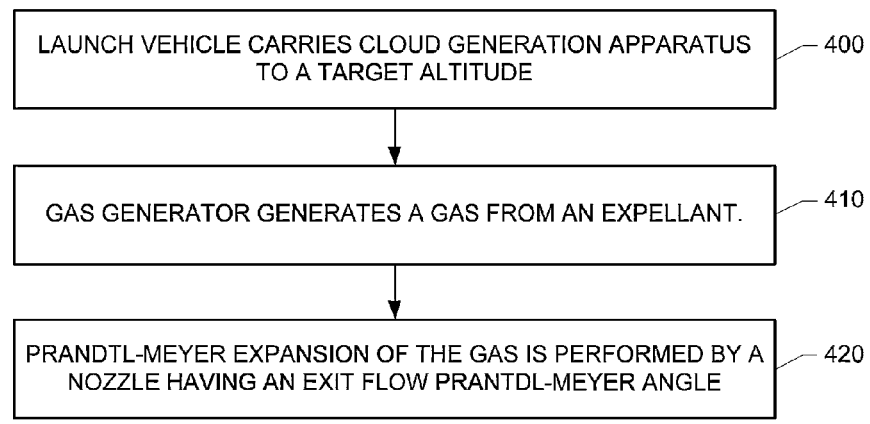
FIG. 4 is an illustration of a method of creating a gaseous cloud for removing space debris having a relatively low ballistic coefficient.

Reference is now made to FIG. 4, which describes a method of creating the cloud. At block 400, a launch vehicle carries cloud generation apparatus to a target altitude (e.g., between 100 and 400 km). For example, the upper stage of the launch vehicle may supply an expellant and gas generation/expansion equipment.

At block 410, the gas generator generates a gas from the expellant. In some embodiments, the gas is generated by burning an expellant including a burn metal. The burn metal may be aluminum or a metal of higher atomic weight than aluminum. In other embodiments, the expellant is a cryogenic noble gas, the gas is generated by vaporizing the cryogenic gas. In other embodiments, the gas is generated by vaporizing a heavy molecular fluid having a low isentropic exponent. In still other embodiments, the gas is generated by reacting high-atomic-weight elements with halogens (e.g., fluorine, chlorine, bromine, or iodine).

At block 420, a Prandtl-Meyer expansion of the gas is performed by a nozzle, Exit flow angle of the nozzle may be a Prandtl-Meyer angle, which modifies spatial distribution of the expanded gas. The nozzle angle selection can tighten or loosen the spatial distribution to some degree, The Prandtl-Meyer angle at the exit plane (radians, or degrees) is a measure of the potential turning of a supersonic flow, as a function of Mach number. The Prandtl-Meyer angle (v) may be expressed as:

$$v=[(\gamma+1)/(\gamma-1)]^{1/2} \arctan\{[(\gamma-1)(M^2-1)/(\gamma+1)]^{1/2}\} - \arctan[(M^2-1)^{1/2}]$$

The Prandtl-Meyer function is quite sensitive to the isentropic exponent ($\gamma$) of the gas, with greater angles possible for low values of the isentropic exponent $\gamma$.

Figure 5:
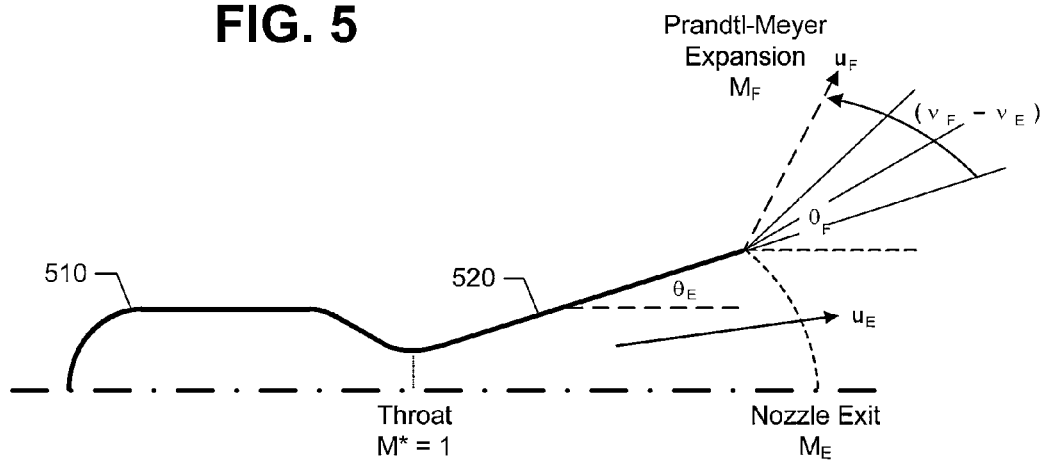
FIG. 5 is an illustration of supersonic gas expansion into a vacuum.

Reference is made to FIG. 5, which illustrates a combustion chamber 510 and a supersonic nozzle 520 of a rocket engine. A subsonic flow of gas exits the combustion chamber 510 and is accelerated to $M^*=1$ at the throat of the nozzle 520. The gas flow is then accelerated to supersonic speed $u_E$ at the exit of the nozzle 520. As the gas moves into a low pressure region surrounding the flow, the exit pressure of the flow will cause the flow to expand laterally, thus turning the flow outward. At the nozzle's edge, it will be as though the flow is turning around a corner. In effect, the expansion will cause the exit Mach number $M_E$ of the flow to increase to a final Mach number $M_{Final}$. Final speed of the flow is denoted by $u_F$.

At the nozzle exit, the Prandtl-Meyer angle $v_E$ is a function of exhaust gas isentropic exponent at the nozzle exit ($\gamma_E$) and the exit Mach number ($M_E$). When the gas is fully-expanded ($M_{Final} \to \infty$), the Prandtl-Meyer angle assumes a limiting maximum (final) value $v_F$ of $$v_F = \tfrac{1}{2}\{[(\gamma+1)/(\gamma-1)]^{1/2}-1\}.$$

The difference between the nozzle exit and final flow angles ($\theta_F - \theta_E$) is equal to the difference between the exit and final Prandtl-Meyer angles ($v_F - v_E$), where ($v_F - v_E$) is the Prandtl-Meyer turning angle. Once a nozzle geometry is specified (including setting the nozzle exit angle $\theta_E$ to a value), the final exit angle ($\theta_F$) becomes $\theta_F = \theta_E + (v_F - v_E)$.

Figure 8A:
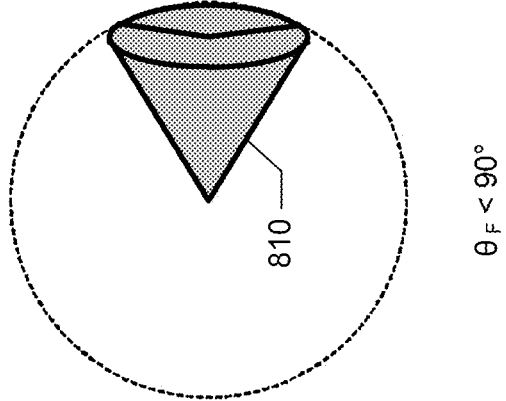
FIGS. 8a-8c are illustrations of different shapes of a gaseous cloud.
Figure 8B:
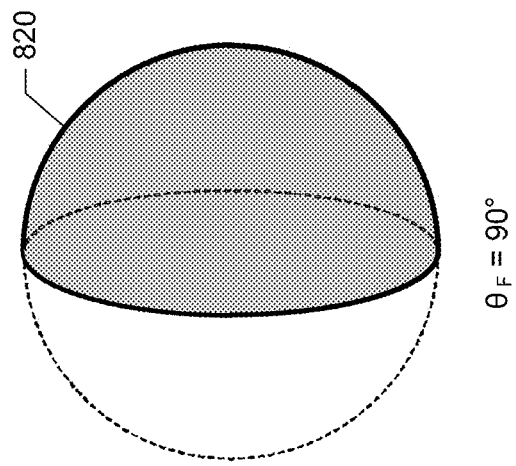
Figure 8C:
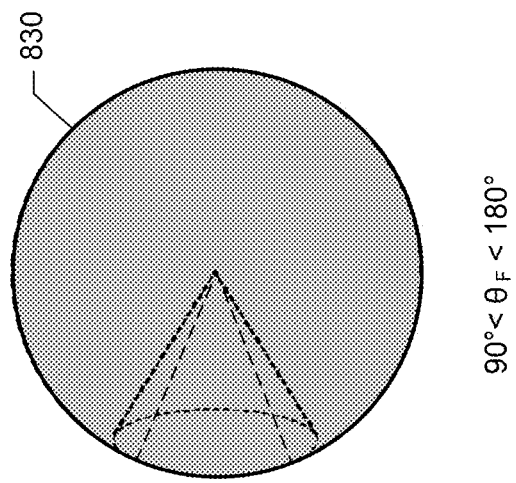

Reference is made to FIGS. 8a-8c, which illustrate how the final exit angle ($\theta_F$) determines the shape of cloud. The final exit angle $\theta_F$ may be characterized as one-half of the vertex angle of the conical flow from the nozzle (at the center of a nominally spherical cloud). For $\theta_F < 90$ degrees, the cloud 810 is a spherical sector that resembles a cone (FIG. 8a). For $\theta_F = 90$ degrees, the cloud 820 is a hemisphere (FIG. 8b). For $90 < \theta_F < 180$ degrees, the cloud 830 will resemble a sphere having a conical hole in its backside.

Reference is now made to FIG. 6, which illustrates an apparatus 610 for creating a gaseous cloud. The principal components of the apparatus 610 include an expellant 620, an expellant storage unit 630 for storing the expellant 620, a gas generator 640 for creating a gas from the expellant 620, and an exhaust nozzle 650.

For those expellants that are combusted, the gas generator 640 may include a combustion chamber. For those expellants that are non-reactive compounds that are vaporized, a combustion chamber would not be needed. Instead, the gas generator 640 would include a chamber for receiving and mixing a chemical exothermic reactant and the compound to be evaporated. The expellant 620 may be carried in a phase that is more compact than gas (as either a liquid or a solid).

In conventional rocket nozzles, the nozzle has a bell-shape, with nozzle exit angle ($\theta_E$) typically being held to a small value ($\theta_E \leq 15°$). A conventional rocket engine would be expected to produce areal densities ranging from $10^{-6}$ to $10^{-8}$ kg/m$^2$, over a radius from 300 to 400 km. However, those areal densities are inadequate by at least two orders of magnitude.

The desired areal density of $10^{-3}$ kg/m$^2$ to $10^{-8}$ kg/m$^2$ may be achieved by controlling final exhaust velocity, total mass outflow, and expulsion time of the expellant. Expulsion time refers to the time to completely expel the expellant from the gas generator 640. In the case of a rocket engine, for example, the expulsion time is the burn time of the propellant. Burn time may be reduced by increasing the chamber pressure. By reducing burn time, the cloud radius would decrease and the enclosed density would increase. The final exhaust velocity and total mass outflow and expulsion time are independently-controlled parameters. Changing any one of these parameters will change could size and areal density, but will not affect either of the other two parameters.

The desired areal density may be achieved in part through the chemistry of the expellant 620. Increasing molecular weight and lowing temperature may increase cloud density and slow cloud expansion. The expellant 620 may include aluminum (26.98 amu) or a burn metal having a higher atomic weight. Preferred burn metals include, but are not limited to, titanium (47.87 amu), zirconium (91.22 amu), and depleted uranium (238.03 amu). These heavier metals increase the cloud density. Certain other metals would also reduce the exhaust velocity of the flow, which would further reduce the cloud radius.

Another type of expellant 620 includes cryogenic noble gas, which is vaporized. The vaporized gas has lower temperature at discharge, and higher isentropic exponent. Noble gases that could be stored cryogenically include, but are not limited to, Helium, Neon, Argon, Krypton, and Xenon. According to the Prandtl-Meyer relationships, a high value of $\gamma$ would result in small final turning angles, which leads to the possibility of discharging a cloud that will more nearly resemble a conical sector of a sphere.

Still another type of expellant 620 is a heavy molecular fluid having a low isentropic exponent. Examples of such fluids include tetrafluoromethane, tetrafluoroethylene, hexafluoroethane, and hexafluoropropylene, octafluoropropane, octafluorocyclobutane, decafluorobutane, perfluorohexane, perfluorodecalin, xenon difluoride, xenon tetrafluoride, bromine pentafluoride, iodine pentafluoride, antimony pentafluoride, antimony pentafluoride, molybdenum hexafluoride, tungsten hexafluoride, and iodine heptafluoride.

To vaporize these fluids, the gas generator may include a boiler. As one example, the boiler may include a constant-volume chemical reactor that heats the fluid in boiler tubes. As another example, the boiler may include a chemical combustion chamber and heat-exchangers.

Yet another type of expellant 620 is high-atomic-weight elements reacted with halogens (fluorine, chlorine, bromine, or iodine). Combustion products would result from the combustion of halogen oxidizers (valence −1) and metal fuels with valences of +1, +2, or +3. Examples of the combustion product include, but are not limited to, calcium bromide, barium chloride, rubidium iodide, cesium bromide, indium trichloride, strontium bromide, boron tribromide, cesium iodide, beryllium iodide, aluminum tribromide, tantalum pentafluoride, magnesium iodide, calcium iodide, barium bromide, gallium tribromide, strontium iodide, indium tribromide, tantalum pentachloride, barium iodide, boron triiodide, aluminum triiodide, gallium triiodide, and tantalum pentabromide.

Figure 7:
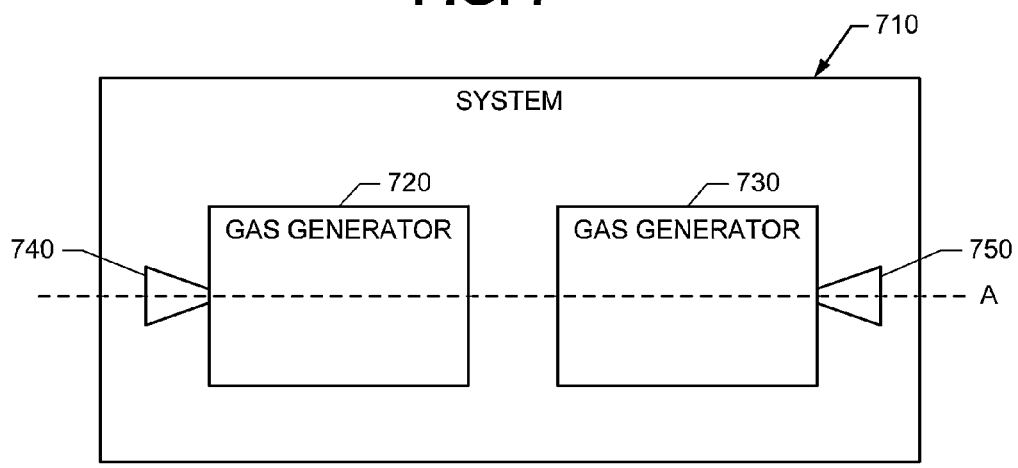
FIG. 7 is an illustration of another apparatus for creating a gaseous cloud for removing space debris.

Reference is now made to FIG. 7, which illustrates another apparatus 710 for creating a gaseous cloud. First and second gas generators 720 and 730 and their associated nozzles 740 and 750 are clustered along a common axis (A), head to head. The nozzles 740 and 750 point 180 degrees apart, and the gas generators 720 and 730 fire simultaneously so that the thrusts are essentially counteracting, thus allowing the apparatus 710 to largely retain its original kinematics and trajectory. The apparatus 710 can create clouds having areal densities from $3\times10^{-5}$ kg/m$^2$ to $10^{-6}$ kg/m$^2$ over a radius of 100 km. The apparatus 710 can radically increasing the total expellant mass.

In some embodiments, a plurality of the apparatus 710 can be assembled into an even larger bundle. For instance, 2× and 6× clusters of the apparatus 710 may be used.

A nozzle herein is not limited to an exit Prandtl-Meyer angle. In some embodiments, the nozzle may have a "trumpet" shape, where nozzle exit angle increases with distance from throat to exit. In other embodiments, the nozzle may have a conical shape.

The invention claimed is:

1. A method for removing space debris having a relatively low ballistic coefficient, the method comprising performing a Prandtl-Meyer expansion of gas to create a transient gaseous cloud at an altitude of at least 100 km above Earth, the cloud slowing the debris by Newtonian flow drag so the debris falls into Earth's atmosphere.

2. The method of claim 1, wherein the cloud has a size of 50 km to 500 km, a mass of 1,000 kg to 10,000 kg, and an areal density of $10^{-3}$ kg/m$^2$ to $10^{-8}$ kg/m$^2$.

3. The method of claim 1, wherein the cloud is allowed to expand without restriction.

4. The method of claim 1, wherein the cloud altitude is between 100 km and 400 km.

5. The method of claim 1, wherein different cleanup zones about Earth are targeted, and a cloud is formed at each zone.

6. The method of claim 1, wherein the cloud is created at a density and temperature to dissipate after creation and fall into the atmosphere.

7. The method of claim 1, wherein the cloud is created to have a shape of one of a sphere and a hemisphere.

8. The method of claim 1, wherein creating the cloud includes generating the gas from an expellant, where a desired areal density of the cloud is achieved in part by controlling expulsion time of the expellant.

9. The method of claim 1, wherein creating the cloud includes clustering first and second gas generators and associated nozzles with the nozzles pointing 180 degrees apart.

10. The method of claim 1, wherein creating the cloud includes creating gas from an expellant including a burn metal of higher atomic weight than aluminum; and expanding the gas.

11. The method of claim 10, wherein the burn metal includes at least one of titanium, zirconium, and depleted uranium.

12. The method of claim 1, wherein creating the cloud includes using a launch vehicle to carry cryogenic noble gas to the altitude; vaporizing the cryogenic gas; and expanding the vaporized gas.

13. The method of claim 1, wherein the cloud is created by expanding a heavy molecular fluid having a low isentropic exponent.

14. The method of claim 1, wherein creating the cloud includes reacting high-atomic-weight elements with halogens to produce combustion products, and expanding the combustion products.

15. A method for removing space debris having a relatively low ballistic coefficient, the method comprising performing a Prandtl-Meyer expansion of gas into a gaseous cloud at an altitude of at least 100 km above Earth, the cloud having a density sufficient to slow the space debris so the debris falls into Earth's atmosphere, the cloud not targeting any specific debris.

* * * * *